(12) United States Patent
Bussit et al.

(10) Patent No.: US 9,422,980 B2
(45) Date of Patent: Aug. 23, 2016

(54) PRE-STRESSED ROLLING BEARING, NOTABLY FOR A STEERING COLUMN

(71) Applicants: Sylvain Bussit, Monnaie (FR); Wilfried Hermle, Irndorf (DE); Daniel Jansen, Tours (FR); Tommy Jullien, Tours (FR); Thomas Lepine, Villandry (FR); Franck Mauvisseau, Monts (FR); Bruno Montboeuf, Cerelles (FR); Lucia Pintz, Buchheim (DE); Heiko Waeschle, Meßstetten (DE)

(72) Inventors: Sylvain Bussit, Monnaie (FR); Wilfried Hermle, Irndorf (DE); Daniel Jansen, Tours (FR); Tommy Jullien, Tours (FR); Thomas Lepine, Villandry (FR); Franck Mauvisseau, Monts (FR); Bruno Montboeuf, Cerelles (FR); Lucia Pintz, Buchheim (DE); Heiko Waeschle, Meßstetten (DE)

(73) Assignee: AKTIEBOLAGET SKF, Gothenburg (SE)

( * ) Notice: Subject to any disclaimer, the term of this patent is extended or adjusted under 35 U.S.C. 154(b) by 138 days.

(21) Appl. No.: 14/223,333

(22) Filed: Mar. 24, 2014

(65) Prior Publication Data

US 2014/0319811 A1 Oct. 30, 2014

(30) Foreign Application Priority Data

Mar. 22, 2013 (EP) .................................... 13305350

(51) Int. Cl.
*F16C 33/60* (2006.01)
*F16C 19/06* (2006.01)
*B62D 1/16* (2006.01)
*F16C 25/08* (2006.01)
*F16C 33/30* (2006.01)
*F16C 33/72* (2006.01)
*F16C 33/61* (2006.01)
*F16C 33/78* (2006.01)

(52) U.S. Cl.
CPC .................. *F16C 33/30* (2013.01); *B62D 1/16* (2013.01); *F16C 25/083* (2013.01); *F16C 33/61* (2013.01); *F16C 33/726* (2013.01); *F16C 33/78* (2013.01); *F16C 19/06* (2013.01); *F16C 2326/24* (2013.01)

(58) Field of Classification Search
CPC .... F16C 19/06; F16C 19/163; F16C 25/083; F16C 33/581; F16C 33/726; F16C 2326/24; F16C 35/77; B62D 1/16; F01C 21/02; Y01S 384/903
USPC ....... 384/477, 490, 492, 495, 499, 500, 502, 384/505, 510, 513, 517, 519, 537, 503, 516, 384/536; 280/779
See application file for complete search history.

(56) References Cited

U.S. PATENT DOCUMENTS 3,351,398 A * 11/1967 Park ........................ F16C 19/26
384/456
3,801,171 A * 4/1974 Rozentals ............. F16C 19/163
384/492

(Continued)

FOREIGN PATENT DOCUMENTS

| DE | 4229199 A1 | * | 3/1994 | ............ F16C 19/166 |
| DE | 9400766 U1 | * | 3/1994 | ............ F16C 19/166 |
| DE | 19744280 A1 | * | 4/1999 | ............ F16C 19/16 |
| DE | 1000781 A1 | * | 5/2000 | ............ B60G 15/067 |
| DE | WO 0242655 A1 | * | 5/2002 | ............... B62D 1/16 |

(Continued)

*Primary Examiner* — Marcus Charles
(74) *Attorney, Agent, or Firm* — Bryan Peckjian; SKF USA Inc. Patent Dept.

(57) ABSTRACT

A rolling bearing includes a first ring, a second ring and a row of rolling elements disposed between the first ring and the second ring. The first ring has a housing, at least two raceway elements are mounted in the housing and at least one pre-stressing element is mounted in the housing. The at least one pre-stressing element is provided with at least one portion having a circumferential extension of less than 360° in sliding contact with the second ring.

19 Claims, 4 Drawing Sheets

(56) References Cited

U.S. PATENT DOCUMENTS

| | | | | |
|---|---|---|---|---|
| 4,438,989 A | * | 3/1984 | Negele | F16C 19/163 384/477 |
| 4,515,418 A | * | 5/1985 | Hogan | B60B 27/0005 384/486 |
| 4,718,781 A | * | 1/1988 | Gerard | F16C 19/166 384/495 |
| 5,458,422 A | * | 10/1995 | Zernickel | F16C 19/166 384/505 |
| 6,846,110 B2 | * | 1/2005 | Lutz | F16C 19/166 384/517 |

FOREIGN PATENT DOCUMENTS

| | | | | |
|---|---|---|---|---|
| DE | WO 2011015374 A1 * | 2/2011 | | B62D 5/0448 |
| DE | 202011000840 U1 * | 7/2012 | | F16C 27/04 |
| DE | 102011003251 A1 * | 8/2012 | | F16C 33/60 |
| DE | 102012202152 A1 * | 8/2013 | | F16J 15/324 |
| DE | 102013225068 A1 * | 6/2015 | | B62D 1/16 |
| FR | WO 2011103917 A1 * | 9/2011 | | B62D 1/16 |
| SE | 1956254 A1 * | 8/2008 | | F16C 25/08 |
| SE | 1985519 A2 * | 10/2008 | | F16C 19/163 |
| SE | 2562435 A1 * | 2/2013 | | F16C 19/163 |
| SE | 2994236 A1 * | 2/2014 | | F16C 19/06 |

* cited by examiner

PRE-STRESSED ROLLING BEARING, NOTABLY FOR A STEERING COLUMN

CROSS-REFERENCE TO RELATED APPLICATIONS

This application claims priority to European Patent Application No. EP13305350.4 filed on Mar. 22, 2013.

FIELD OF THE INVENTION

The invention relates to pre-stressed rolling bearings, having an inner ring and an outer ring with one or more rows of rolling elements, for example balls. The rolling bearings may be, for example, those used in a steering column for automotive vehicles, industrial electric motors or electro-mechanical actuators.

BACKGROUND OF THE INVENTION

A steering column of an automotive vehicle generally comprises an inner tube of shaft having one of its end portions linked with a steering wheel actuated by the driver and the other of its end portions linked to mechanical elements, such as a toothed rack. The shaft of the steering column is mounted inside an outer tube via two rolling bearings assemblies. Each of the rolling bearing assemblies generally comprises a rolling bearing, for example a ball bearing, with an outer ring and an inner ring between which rolling elements are mounted and maintained by a cage element.

European patent application EP-A1-1 956 254 discloses a pre-stressed rolling bearing comprising an inner ring, an outer ring provided with a housing and two annular wires arranged in the housing to form raceways, a row of balls disposed between the wires and the inner ring, and a pre-stressing element made from elastic material and axially disposed between a first radial flange of the housing and one of the wires. A second radial flange of the housing is pressed against the other wire so as to exert an axial compression force on the pre-stressing element and to preload the rolling bearing both axially and radially.

It is generally required for such rolling bearings for steering column to work at a friction torque as reduced and as constant as possible. However, it may requested for an automotive application, notably for cars at top end of the range, to increase the friction torque of the steering column compared to those applied for cars at medium or low end of the range. Therefore the driver has to apply a more important torque to the driving wheel, and then feels a robustness sensation of the vehicle. This feeling of conduct contributes to the quality image of a vehicle for a driver.

It is therefore a particular object of the present invention to overcome these aforementioned constraints by providing a rolling bearing of simple design with a reduced number of components that is easy to assemble, economical, able to operate for a long time in both an effective and an economic manner, while guaranteeing a high friction torque.

SUMMARY OF THE INVENTION

The invention concerns a rolling bearing comprising an inner ring, an outer ring and a row of rolling elements between the rings. At least one of the rings comprises a housing, at least two raceway elements mounted in the housing and at least one pre-stressing element mounted in the housing.

According to the invention, at least one pre-stressing element mounted in one ring is provided with at least one portion having a circumferential extension of less than 360° and in sliding contact with the other ring.

Thanks to this invention, the friction torque of the rolling bearing, and then of the steering column of the automotive vehicle, is increased. The portion in sliding contact with the other ring defines at least one window.

Such a window permits to uniformly circumferentially distribute the friction torque, notably for a number of 3 or more windows.

Lubricant for the rolling elements between the inner and outer rings may migrate to the window. The lubricant is efficiently distributed during the rotation of one inner ring relative to the other so as to reduce friction torque variations.

According to further aspects of the invention, which are advantageous but not compulsory, such a rolling bearing may incorporate one or several of the following features as long as there is no contradiction:

The rolling elements are balls.
The rolling elements are circumferentially spaced by a cage. The cage may comprise a backbone disposed on the opposite side of the pre-stressing element.
At least one of the raceway elements mounted in the housing of one ring is an annular wire.
At least one of the raceway elements mounted in the housing of one ring is a ring made of a stamped metal sheet. The ring comprises a toroidal concave portion forming a raceway for the rolling elements.
One ring is of massive type and comprises a toroidal concave portion forming a raceway for the rolling elements.
The housing of one ring comprises an outer axial portion and two radial lateral flanges. Each flange extends radially from the outer axial portion towards the other ring.
The pre-stressing element is disposed axially between one lateral flange of the housing and one raceway element of one ring.
The pre-stressing element is made from elastic material, for example an elastomer such as nitrile rubber or polyurethane.
The pre-stressing element is made from elastic material stiffened by an additive material for wear resistance due to friction, for example graphite.
The pre-stressing element is annular and is provided with a first portion maintained in the housing of one ring and at least one second portion in sliding contact with the other ring.
The axial length of the first portion is higher than or equal to the axial length of the second portion.
The second portion is a lip.
The second portion is radially extending from a root of the first portion, the root being offset axially towards the rolling elements.
The at least one portion sliding against the other comprises at least one bended portion.
The pre-stressing element is maintained by an axial maintaining portion so as to prevent expansion or creep of the pre-stressing element.
The axial maintaining portion is axially extending from a lateral radial flange of the housing of one ring.
The axial maintaining portion is a rigid insert in the pre-stressing element.
The pre-stressing element is overmoulded onto the axial maintaining portion.

The at least one portion in sliding contact with the other ring has a circumferential extension equal to or less than 45°.

The at least one portion in sliding contact with the other ring defines edges such as two adjacent edges are circumferentially spaced equal to or less than 45°, advantageously equal to or less than 10°.

The at least one portion in sliding contact with the other ring defines circumferential edges having any kind of shape: linear, curved, notched, etc.

The edges of the portions in sliding contact with the other ring have all the same shape.

The edges of the portions in sliding contact with the other ring have different shapes.

The pre-stressing element comprises a plurality of second portions in sliding contact with the inner ring, the second portions being circumferentially equally spaced.

The present invention also concerns a steering column for an automotive vehicle comprising a chassis with a mounting support, a shaft and at least one pre-stressed rolling bearing according to any of the preceding embodiments mounted on the chassis mounting support and the shaft.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
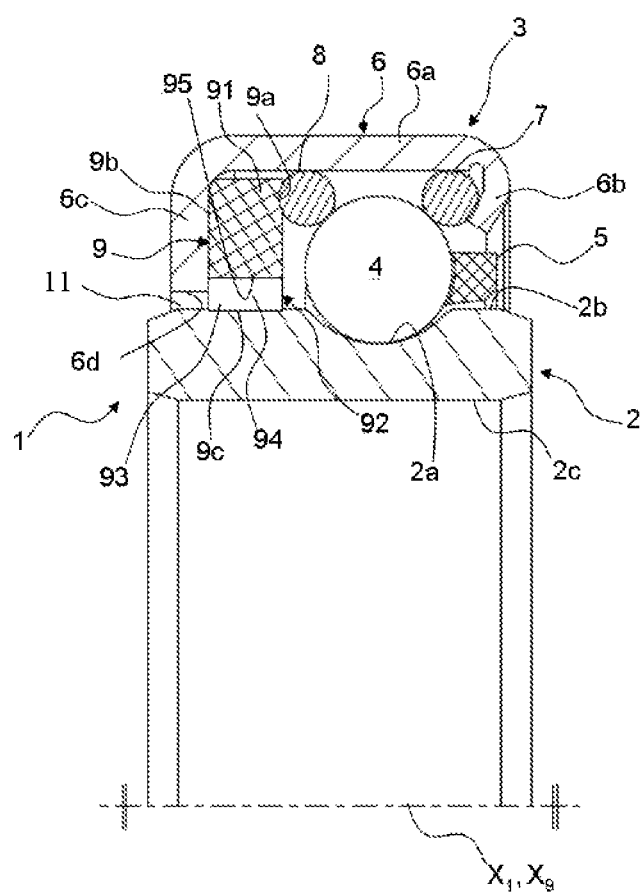
FIG. 1 is an axial half-section of a pre-stressed rolling bearing according to a first embodiment of the invention.

Referring first to FIG. 1, which illustrates a first embodiment of a rolling bearing according to the invention, a rolling bearing 1 of central axis $X_1$ comprises an inner ring 2, an outer ring 3, one row of rolling elements 4, for example balls, and a cage 5 disposed radially between the rings to maintain a regular circumferential spacing between the rolling elements 4.

The inner ring 2 is solid and has an inner bore 2c, an exterior cylindrical surface 2b provided with a toroidal concave surface 2a forming a raceway for the rolling elements 4. The radius of curvature of the groove 2a is slightly greater that the radius of the rolling elements 4. The inner ring 2 may be manufactured by machining or by pressing a steel blank which is then ground and optionally lapped at the raceway in order to give the ring 2 its geometric characteristics and its final surface finish. In this example, the groove 2a is offset axially with respect to a radial mid-plane of the inner ring 2.

The outer ring 3 comprises a housing 6, two raceway elements 7 and 8 and a pre-stressing element 9 acting on one raceway element 8.

The housing 6 is advantageously made of stamped metal sheet. The housing 6 is annular and comprises an outer axial portion 6a and two radial lateral flanges 6b and 6c, each flange extending radially inwards from one end of the outer axial portion 6a. A radial gap 11 is provided between the inner axial edge 6d of the radial portion 6c and the outer cylindrical surface 2b of the inner ring 2 so as to prevent any contact with the housing 6.

The raceway elements 7 and 8 are identical and, in this example, consist in annular wires formed of a roller wire which ends are face-to-face when the wire is fitted into the housing 6.

The raceway element 7 is arranged in contact with the rolling elements 4, the bore of the outer axial portion 6a, and the inner surface of the radial portion 6b.

The raceway element 8 is arranged in contact with the rolling elements 4, the bore of the outer axial portion 6a, and a first radial surface 9a of a first portion 91 of the pre-stressing element 9. The pre-stressing element 9 is annular and disposed axially between the lateral flange 6c of the housing 6 and the raceway element 8. A second radial surface 9b of the first portion 91 of the pre-stressing element 9 is in contact with the inner surface of the lateral flange 6c.

The pre-stressing element 9 is made from elastic material, such as nitrile rubber or polyurethane. The pre-stressing element 9 has an axis $X_9$ which is coincident with $X_1$ in normal use.

As previously mentioned, the lateral flange 6b of the housing 6 is curved towards the rolling elements 4 so as to contact the raceway element 7. The flange 6b presses the raceway element 7 so as to exert, via the rolling elements 4, an axial compression force on the first portion 91 of the pre-stressing element 9 and to preload the rolling bearing both axially and radially. The first portion 91 of the pre-stressing element 9 may be elastically deformed by the load exerted by the raceway element 8.

According to the invention, the pre-stressing element 9 comprises at least one second portion 92 having a circumferential extension of less than 360° and having an inner bore 9c in sliding contact with the outer cylindrical surface 2b of the inner ring 2.

The second portion 92 extends radially from the first portion 91 of the pre-stressing towards the inner ring 2. Such a contacting portion 92 permits to increase the friction torque during the relative rotation between the inner ring 2 and the outer ring 3.

As previously mentioned the portion 92 circumferentially extends on less than 360° and then defines at least one window 93 between two adjacent radial edges 94 and an axial edge 95.

In the first embodiment illustrated in FIG. 1, both first portion 91 and second portion 92 of the pre-stressing elements have a rectangular shape and the same radial length. The window 93 has a rectangular shape in an axial cross-section.

Figure 2:
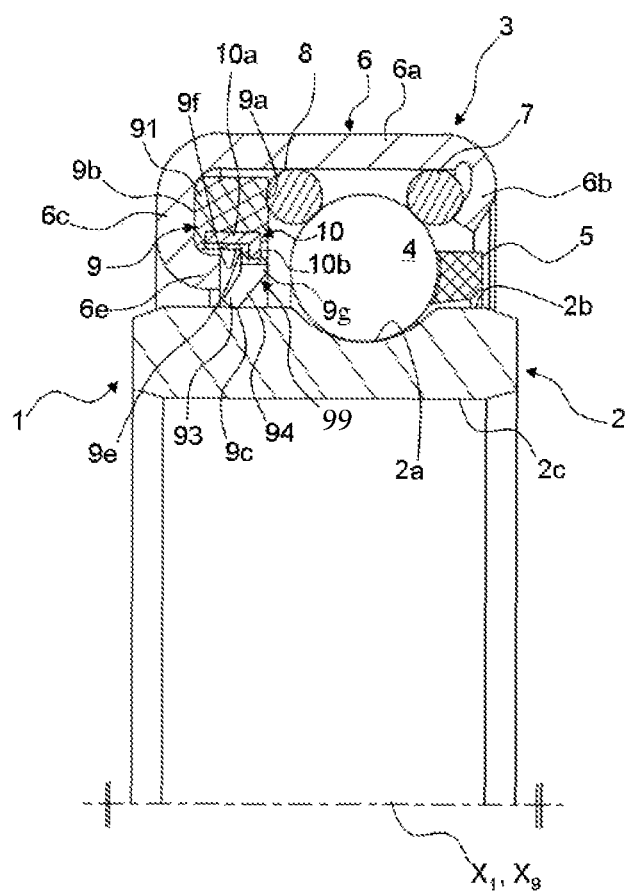
FIG. 2 is an axial half-section of a pre-stressed rolling bearing according to a second embodiment of the invention.
Figure 3:
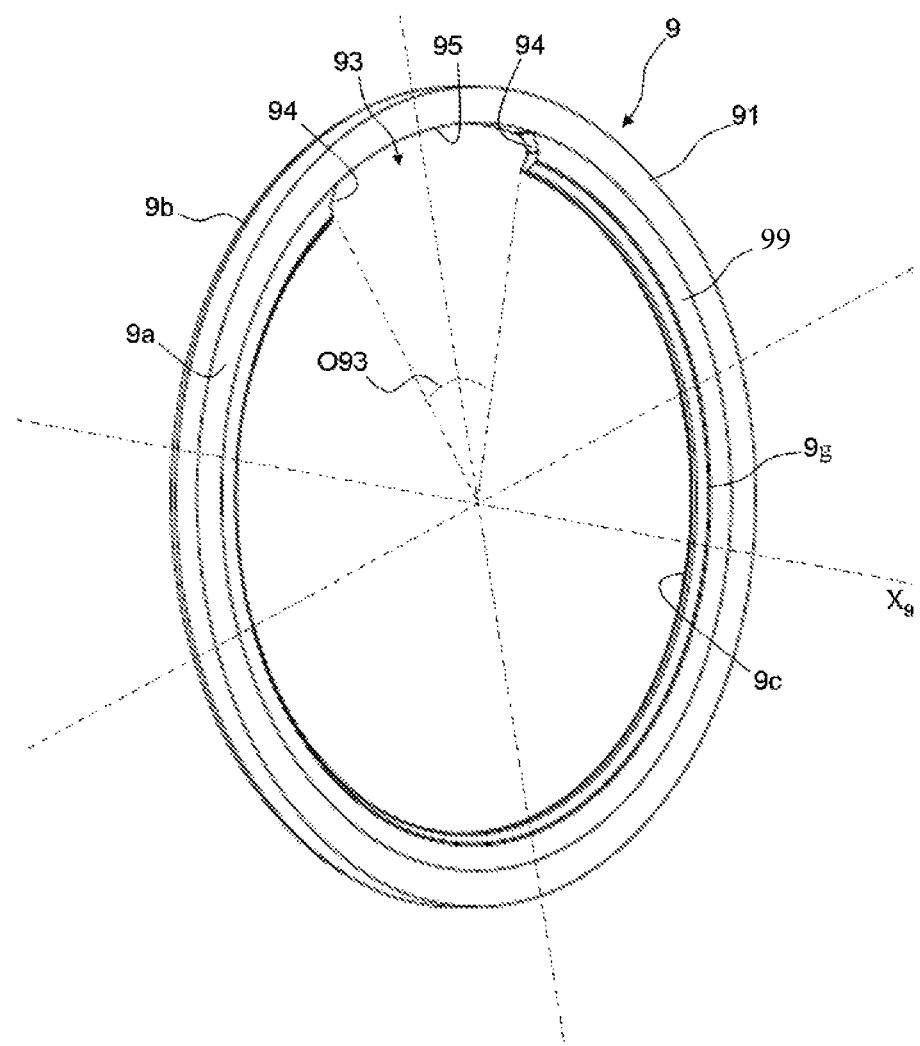
FIG. 3 is a perspective view of a pre-stressing element according to a first example of the second embodiment of the invention.
Figure 4:
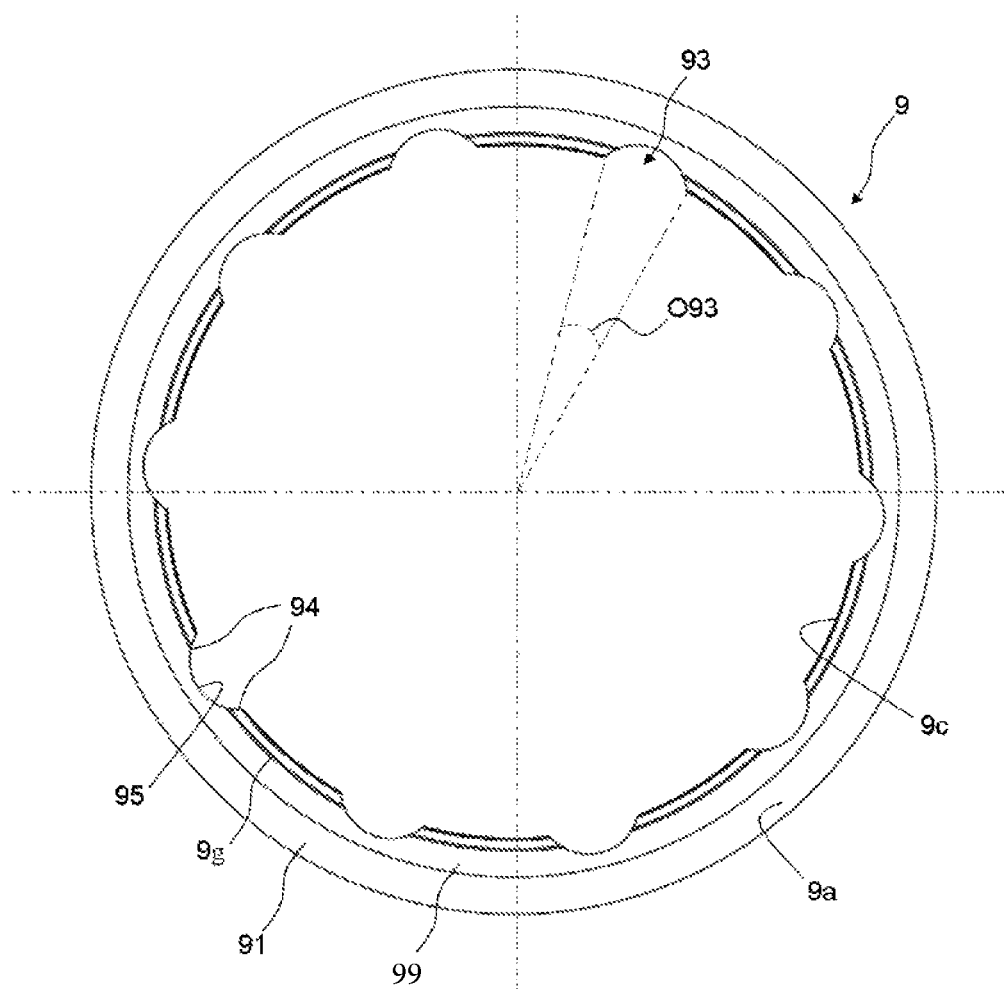
FIG. 4 is a front view of a pre-stressing element according to a second example of the second embodiment of the invention.

The second embodiment illustrated in FIGS. 2 to 4, in which identical elements bear the same references, differs from the embodiment of FIG. 1 in that the second portion 92 of the pre-stressing element 9 is replaced by a lip 99 in sliding contact with the inner ring 2.

The lip 99 has an axial length strictly lower than the axial length of the first portion 91 dedicated to exert the pre-load.

The lip 99 extends from a root 9e of an inner axial surface 9f of the first portion 91 towards the inner ring 2. The inner axial surface 9f is defined by the difference of axial length between the lip 99 and the first portion 91. Advantageously, the root 9e is offset axially towards the rolling elements 4.

The lip 99 comprises a bended portion 9g directed towards the exterior of the rolling bearing 1, i.e. in the opposite direction of the rolling elements 4.

The pre-stressing element 9 also comprises a stiffening insert 10 provided with an axial portion 10a forming an axial maintaining portion to prevent the expansion or the creep of the compressed first portion 91.

The insert 10 also comprises a radial portion 10b radially extending from the axial portion 10a towards the inner ring 2 so as to partly extending into the second portion 92. Such a radial portion 10b of the insert 10 prevents axial deformation of the second portion 92 in order to have a constant sliding contact with the inner ring 2.

The lateral flange 6c of the housing 6 bearing against the first portion 91 of the pre-stressing element 9 axially extends with an axial portion 6e. This axial portion 6d of the housing 6 partly covers the inner axial surface 9f of the first portion 91 so as to form another axial maintaining portion to prevent the expansion or the creep of the compressed first portion 91.

According to the invention, the second portion 92 consisting in a lip has a circumferential extension of less than 360° and then defines at least one window 93 between two adjacent radial edges 94.

According to a first example of this second embodiment of the invention as illustrated in FIG. 3, the pre-stressing element 9 comprises one unique second portion 92 that defines one window 93 extending circumferentially on an angular sector O93 between two radial edges 94 and an axial edge 95. In the illustrated example, the angular sector O93 is equal to 45°.

According to a second example of this second embodiment of the invention as illustrated in FIG. 4, the pre-stressing element 9 comprises a plurality of second portions 92. A window 93 is defined between two adjacent edges 94 of two adjacent second portions 92. In the illustrated examples, the windows 93 are all identical having a arc-circle shape in a radial plane. Each window 93 extends circumferentially on an angular sector O93 between two radial edges 94, for example equal to 10°.

As non illustrated embodiments, the number and the shape of the windows 94 may vary. A combination of multiple shapes for the windows 93 may be possible.

In the disclosed embodiments, the outer ring 3 comprises a housing 6 and two raceway elements 7 and 8, and the inner ring 2 is of the solid type. Alternatively, it may be possible to foresee an arrangement with the elements inverted.

The technical characteristics of the embodiments and alternate variations considered above may be combined.

The invention claimed is:

1. A rolling bearing comprising:
a first ring,
a second ring and
a row of rolling elements disposed between the first ring and the second ring, the first ring having a housing, at least two raceway elements mounted in the housing and at least one pre-stressing element mounted in the housing, wherein
the at least one pre-stressing element is provided with at least one portion having a circumferential extension of less than 360° in sliding contact with the second ring.

2. The rolling bearing according to claim 1, wherein the at least one portion in sliding contact with the second ring has a circumferential extension equal to or less than 45°.

3. The rolling bearing according to claim 2, wherein the at least one portion in sliding contact with the second ring defines two adjacent edges that are circumferentially spaced equal to or less than 45°.

4. The rolling bearing according to claim 3, wherein the at least one portion in sliding contact with second ring defines edges having all the same shape.

5. The rolling bearing according to claim 4, wherein the second ring is an inner ring and wherein the pre-stressing element provides a plurality of portions in sliding contact with the inner ring, the portions being circumferentially equally spaced.

6. The rolling bearing according to claim 5, wherein the pre-stressing element is made from elastic material stiffened by an additive material for wear resistance due to friction.

7. The rolling bearing according to claim 6, wherein the pre-stressing element is annular and is provided with a first portion maintained in the housing and at least one second portion in sliding contact with the second ring.

8. The rolling bearing according to claim 7, wherein the axial length of the first portion is higher than or equal to the axial length of the second portion.

9. The rolling bearing according to claim 8, wherein the at least one second portion extends radially from a root of the first portion, the root being offset axially towards the rolling elements.

10. The rolling bearing according to claim 9, wherein the at least one portion provides at least one bended portion in sliding contact with the second ring.

11. The rolling bearing according to claim 10, wherein the pre-stressing element is maintained by an axial maintaining portion so as to prevent expansion or creep of the pre-stressing element.

12. The rolling bearing according to claim 11, wherein the housing provides an outer axial portion and two radial lateral flanges, each flange extending radially from the outer axial portion and the pre-stressing element is disposed axially between one lateral flange of the housing and at least one raceway element.

13. The rolling bearing according to claim 12, wherein the at least one raceway element is an annular wire.

14. A steering column for an automotive vehicle, comprising;
a chassis with a mounting support,
a shaft, and
at least one rolling bearing according to claim 1.

15. The rolling bearing according to claim 1, wherein the pre-stressing element comprises an elastic body.

16. A rolling bearing comprising:
a first ring;
a second ring; and
a row of rolling elements disposed between the first ring and the second ring, the first ring having a housing;
at least two raceway elements mounted in the housing; and
at least one elastic body mounted in the housing, wherein the at least one elastic body is provided with at least one portion having a circumferential extension of less than 360° and in sliding contact with the second ring.

17. The rolling bearing according to claim 16, wherein each of the at least two raceway elements comprises an annular wire.

18. The rolling bearing according to claim 16, wherein the elastic element is stiffened by an additive material for wear resistance due to friction.

19. The rolling bearing according to claim 16, wherein the housing includes a radially extending portion and wherein the elastic body is compressed between the radially extending portion and one of the at least two raceway elements.

* * * * *